United States Patent
de Souza et al.

(10) Patent No.: US 12,549,624 B2
(45) Date of Patent: Feb. 10, 2026

(54) ARTIFICIAL INTELLIGENCE (AI) BASED SUSTAINABILITY AWARE LOAD BALANCING IN A HYBRID CLOUD CONTEXT

(71) Applicant: INTERNATIONAL BUSINESS MACHINES CORPORATION, Armonk, NY (US)

(72) Inventors: Elton de Souza, Scarborough (CA); John S. Werner, Fishkill, NY (US); Sneha Mary Varghese, Fishkill, NY (US); Kavita Sehgal, Poughkeepsie, NY (US); Diane Marie Stamboni, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 18/473,399

(22) Filed: Sep. 25, 2023

(65) Prior Publication Data

US 2025/0106276 A1    Mar. 27, 2025

(51) Int. Cl.
*H04L 67/1008* (2022.01)
*G06N 20/00* (2019.01)

(52) U.S. Cl.
CPC ......... *H04L 67/1008* (2013.01); *G06N 20/00* (2019.01)

(58) Field of Classification Search
CPC .... H04L 41/0833; H04L 45/48; H04W 40/10; G06F 9/45558; G06F 2009/45595
See application file for complete search history.

(56) References Cited

U.S. PATENT DOCUMENTS

| 8,145,761 | B2 | 3/2012 | Liu | |
| 8,751,844 | B2 | 6/2014 | Mazzaferri | |
| 11,863,388 | B1* | 1/2024 | Pignataro | H04L 41/0833 |
| 2020/0209936 | A1 | 7/2020 | Sharma | |
| 2024/0007522 | A1* | 1/2024 | Suri | H04L 61/4511 |
| 2024/0354142 | A1* | 10/2024 | Sethi | G06F 9/45558 |
| 2025/0036482 | A1* | 1/2025 | Barton | H04L 41/0833 |

OTHER PUBLICATIONS

Ahmed, et al., "Machine Learning for Load Forecasting in a Green Data Center," 2022 4th International Conference on Sustainable Technologies for Industry 4.0 (STI), Dec. 2022 [accessed on Jun. 14, 2023], 5 pages, IEEE, Dhaka, BD, IN, DOI: 10.1109/STI56238.2022.10103320, Retrieved from the Internet: <URL: https://ieeexplore.ieee.org/abstract/document/10103320>.

(Continued)

*Primary Examiner* — Mahran Y Abu Roumi
(74) *Attorney, Agent, or Firm* — Teddi E. Maranzano (57) ABSTRACT

A method, system, and computer program product for load balancing by a sustainability aware load balancer are provided. The load balancer collects power consumption metrics for each server endpoint in a topology. The power consumption is based on a workload and characteristics of a plurality of transactions on the server. A machine learning regression model based is built on the collected power consumption metrics. A target server is selected for the transaction, based on the machine learning regression model identifying the server consuming the least amount of power while meeting service level agreements, and the transaction is routed to the target server.

20 Claims, 5 Drawing Sheets

(56) References Cited

OTHER PUBLICATIONS

Pei, et al., "Minimal Green Energy Consumption and Workload Management for Data Centers on Smart City Platforms," Sustainability—Green Energy and Smart Systems: Special Issue [journal article], Apr. 14, 2020, 15 pages, vol. 12, Issue 8, Article No. 3140, MDPI, DOI: 10.3390/su12083140, Retrieved from the Internet: <URL: https://www.mdpi.com/2071-1050/12/8/3140>.

Sulimani, et al., "Sustainability of Load Balancing Techniques in Fog Computing Environment: Review," Procedia Computer Science [journal article], Aug. 2021, pp. 93-101, vol. 191, The 18th International Conference on Mobile Systems and Pervasive Computing (MobiSPC), Leuven, BE, DOI: 10.1016/j.procs.2021.07.015, Retrieved from the Internet: <URL: https://www.sciencedirect.com/science/article/pii/S1877050921014071>.

Yadav, et al., "MeReg: Managing Energy—SLA Tradeoff for Green Mobile Cloud Computing," Wireless Communications and Mobile Computing [journal article], Dec. 2017, 12 pages, vol. 2017, Article 6741972, Hindawi, DOI: 10.1155/2017/6741972, Retrieved from the Internet: <URL: https://www.hindawi.com/journals/wcmc/2017/6741972/>.

\* cited by examiner

ARTIFICIAL INTELLIGENCE (AI) BASED SUSTAINABILITY AWARE LOAD BALANCING IN A HYBRID CLOUD CONTEXT

BACKGROUND

The present invention relates to computer systems, and more specifically to AI based sustainability aware load balancing in a hybrid cloud context.

Sustainability, specifically the environmental component of Environmental, Social, and Governance (ESG), is increasing in focus for organizations. While sustainability may be addressed at the workload orchestration level, currently, a method does not exist to optimally route traffic at the network layer to optimize for sustainability.

It would be advantageous to optimize the network layer for sustainability, including the Domain Name System (DNS) servers, load balancers, routers, and other network components.

SUMMARY

A method is provided for load balancing by a sustainability aware load balancer. Power consumption metrics for each server endpoint in a topology are collected. The power consumption is based on a workload and characteristics of a plurality of transactions on the server. A machine learning regression model is built that is based on the collected power consumption metrics. A target server is selected for the transaction. The selection is based on the machine learning regression model identifying the server consuming the least amount of power while meeting service level agreements. The transaction is routed to the target server.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Sustainability, specifically the environmental component of Environmental, Social, and Governance (ESG), is increasing in focus for organizations. While sustainability may be addressed at the workload orchestration level, there is no method to optimally route traffic at the network layer to optimize for sustainability.

Embodiments of the present invention tend to improve an organization's sustainability metrics, such as kilowatt usage per hour (KWH), watts per transaction (W/tx), metric tons of carbon (MTOC), and carbon dioxide equivalent ($CO_2e$) by performing sustainability aware load balancing at the network layer. This can be performed at any layer of the networking stack (Layer 2 and above of the Open Systems Interconnection (OSI) Model as an example) and across Metropolitan Area Networks/Wide Area Networks (MANs/WANs)—inter and intra data center.

Service level agreement (SLA) envelopes, such as throughput, latency percentile, and uptime, are still respected while maximizing for sustainability goals including reduced net power consumption and carbon emissions.

Optimal routing is done by tracking power consumption per server endpoint, then correlating transaction and power consumption per workload type. Artificial intelligence (AI) models can be used to route the traffic to the most sustainability-oriented end point while still maintaining SLAs.

It would be advantageous to optimize the network layer for sustainability. The network layer includes the Domain Name System (DNS) servers, load balancers, routers, and other network components.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
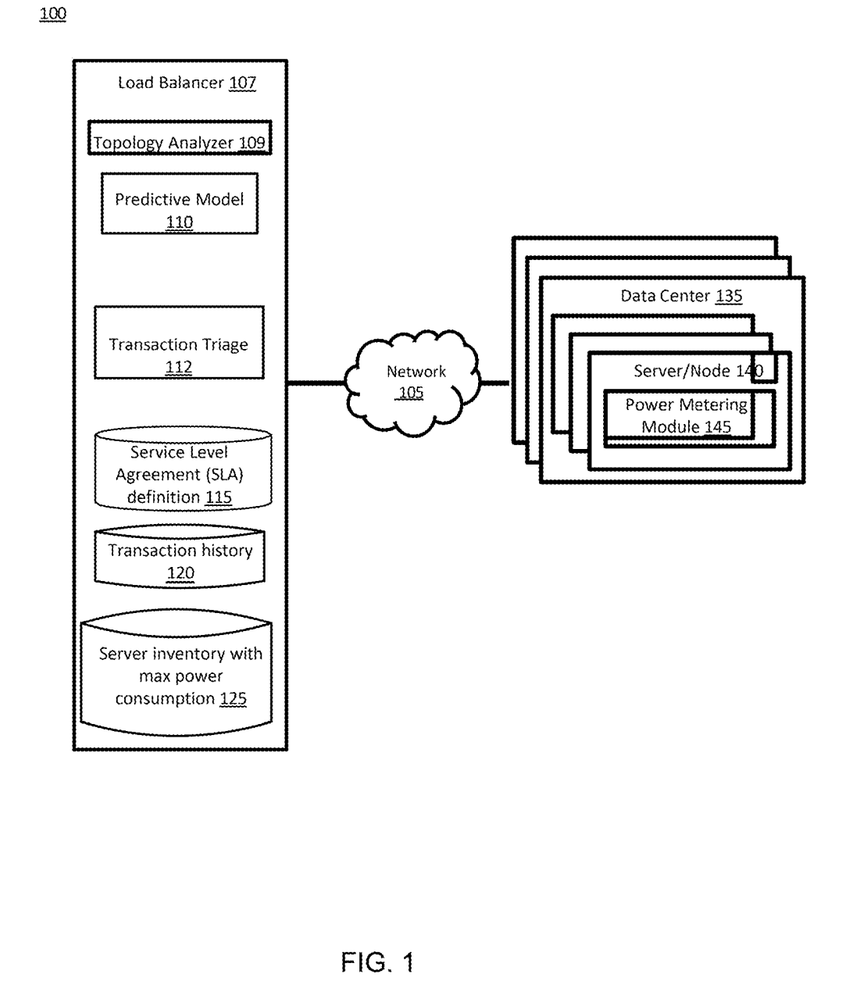
FIG. 1 illustrates an exemplary network flow diagram, in accordance with one or more aspects of the present invention.

Beginning now with FIG. 1, a network diagram 100 illustrates the components of a sustainability aware load balancer, which optimally directs transaction flow in a hybrid cloud system. Here, sustainability implies net carbon emissions, typically measured in metric tons of carbon (MTOC) required to power the computing equipment for power consumption. Sustainability also refers to cooling costs and physical sustainability, such as floor space occupied by the computing equipment in the data center(s) 135, and optimization of those costs.

The load balancer 107 comprises the predictive model 110 of the topology analyzer 109. The load balancer 107 can be a hardware appliance that manages all or a portion of, for example a layer, of the network. In preferred embodiments, the load balancer 107 can manage the entire network because the service level agreements (SLA) reference total transaction times from beginning to end.

The topology analyzer 109 determines the current network topology which may be constantly changing due to systems/servers being added or removed from the network. This helps the system to know the number of currently available systems in the next layer to route to. Current workload of these systems, their location or proximity to other systems, network speeds, power, etc. are all constantly monitored by topology analyzer 109. This information could be extracted from systems, networking components, or from a data center infrastructure management (DCIM) tools or network topology mapping software.

The predictive model 110 takes, as input data, from the SLA definitions 115, transaction history 120, and the server inventory 125 to determine the optimal transaction flow over the network 105 to the most sustainable server for that specific transaction.

Figure 4:
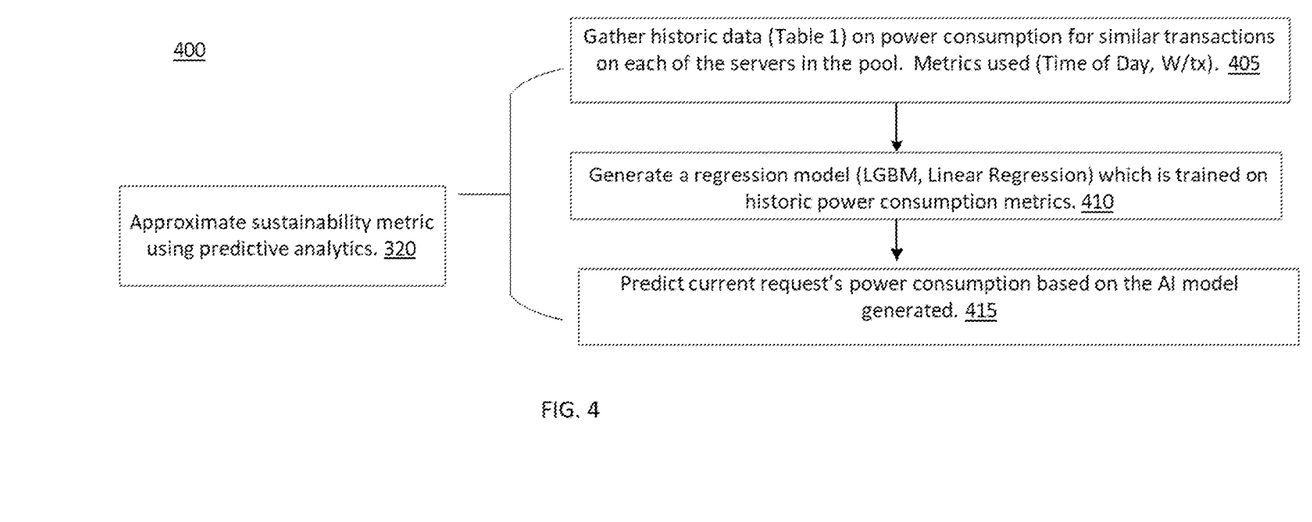
FIG. 4 illustrates applying artificial intelligence (AI) and predictive modelling, according to embodiments of the present invention.

In an embodiment, the predictive model 110 is based on simple regression models or on more complex neural net models. FIG. 4 describes this process in greater detail along with a sample of data, Table 1, of FIG. 4A. The network flow is directed by the transaction triage 112 by leveraging input from the predictive model 110. The transaction triage 112 is a buffer or temporary memory location where the incoming transactions wait while their information is processed along with other data in the model 110 to determine the next system to go to within the network for sustainability, while also meeting SLAs.

The SLA 115 defines metrics to which the server/nodes 140 of the data center(s) 135 are expected to adhere while supporting the workloads. The metrics include a latency percentile, throughput per second, availability, and uptime guarantees. Several SLAs may exist. In the context of embodiments of the present invention, performance SLAs of latency and throughput are the key metrics. Ultimately, power is the key metric for sustainability, but power is typically not an SLA metric. Therefore, embodiments of the present invention determine the route with the lowest overall power while meeting the latency and throughput SLAs. For example, if an SLA requires a transaction to complete in one second, it may be possible to use the highest performance systems to execute the transaction in 300 ms. However, this is excessive in many cases, and systems with less performance could be used to slow down the transaction completion slightly to 900 ms. This would still meet the SLA requirement and may use systems that consume less power in the process.

The transaction history 120 is a ledger of historical triaging of transactions per workload type to the appropriate servers that the predictive model 110 uses as input. In this context, a ledger is a database that holds a record, or metadata, from a transaction, although some embodiments can keep the transaction data if desired in the database/ledger. In addition to the data or metadata, the path, e.g., the servers/nodes taken is tracked. Also tracked are power information from those systems, the total workload/utilization on those systems when the transaction was processed, running conditions of those systems (temp, humidity, altitude, hardware availability, system faults/errors), latency, throughput, any data that can help the model 110 learn and improve for future routing. The ledger/database can be thought of as training data for model 110. In some embodiments, once the training data is used to update model 110, the data may be discarded. The transactions can be routed inter and intra the data center 135.

In an embodiment, a load balancer 107 is placed between each layer of servers/nodes 140 that communicate over the network 105. In some embodiments, the load balancers 107 may not communicate with each other, but may receive additional information about the path taken up to the point the transaction was received, such that the load balancer 107 can make intelligent decisions for the next routing to meet SLAs. In other embodiments, a single load balancer 107 may be used for one or more stages along the traffic flow path.

Figure 2:
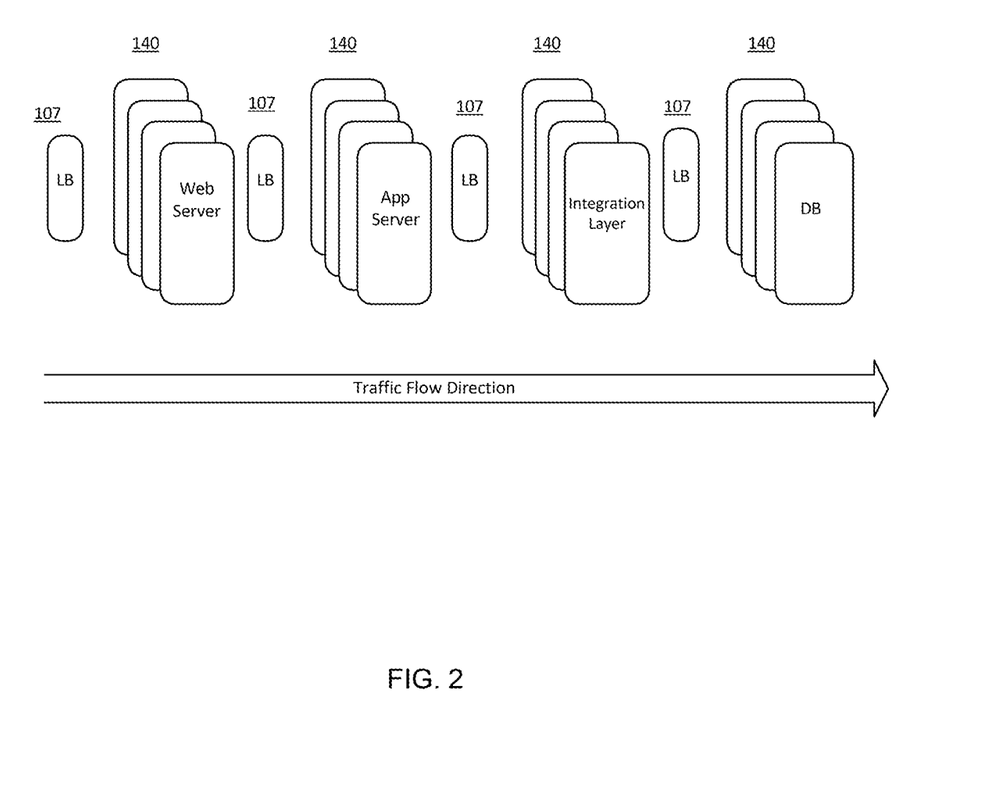
FIG. 2 illustrates possible locations of load balancers in a multi-tier application.

A sample flow for a transaction is provided in FIG. 2. Each server/node 140 can perform all or part of the transaction, depending on the resources the transaction requires.

The server inventory 125 includes information on total maximum power consumption for each server in the topology in addition to workload, environmental, or hardware specific power consumption, if any. For example, a first server that is 25% utilized with no faults in a 20 C ambient room may have a power consumption of 1000 W. A second server of the same make and model as the first server that is 25% utilized with no faults in a 30 C ambient room may have a power consumption of 1200 W due to increased fan speeds in the warmer environment. A third server that is a different make and model from the first server that is 25% utilized with no faults in a 20 C ambient room may have a power consumption of 950 W simply because it is newer and more efficient than the first server. The first server, when 75% utilized with no faults in a 20 C ambient room, may have a power consumption of 1800 W due to higher fan speeds and higher power draw from the processors, memory, and IO subsystems. The first server when 75% utilized with a failed power supply (the system typically has redundant power supplies that share the load) in a 20 C ambient room may have a power consumption of 1900 W due to the power supply operating at a lower power factor at higher loads.

These values are constantly changing due to the rapid execution of transactions and workload fluctuations, thereby making the task impossible for a human to execute a set of rules to be pre-programmed and followed. This is the advantage of implementing AI to build a model based off this data and properly route transactions for meeting SLAs with the lowest overall power consumption.

Power utilization may also change on a system if hardware is replaced/upgraded, such as e.g., new memory DIMMs, new processors, new IO cards, more efficient fan assemblies, etc. Therefore, the hardware inventory of each system could also be extracted and stored in some embodiments. This can be done by requesting vital product data (VPD). VPD contains serial numbers in some embodiments, so in very granular use cases of this invention, even part to part variance can be considered. For example, two of the exact same fan assemblies may draw different power under the exact same conditions due to variations in the materials, sizes, components, etc. used to manufacture them.

In some embodiments, other data known or learned about each server may be stored, such as typical workloads at different days, times, etc., power consumption under different workloads, processing speeds, memory fetching speeds, or any other performance metric of servers/nodes 140 in the topology.

The power metering module 145 provides access to the total power drawn by each server/node 140, which is added to the transaction history database 120. Using information from orchestration tooling, such as Kubernetes, the server/node 140 is also aware of the workload(s) running at any given point in time. Power may be extracted via programming instructions to request the data from load balancer 107 or may be extracted from a DCIM that tracks power utilization of each system/node in a data center. Power may also be extracted via programming instructions to intelligent PDU output ports, or infrastructure level power management tools that may be installed on plugs/outputs in a data center. If using Kubernetes for extracting workload data, the Kubernetes power manager can also be used to extract power data.

FIG. 2 illustrates a sample flow for a transaction, and possible locations of load balancers 107 in a multi-tier application, although other applications may have different topologies. For example, the load balancer 107 may be placed at the start of the transaction only or may be placed at every stage of the transaction (as shown) for granular optimization. In FIG. 2, the workload specifies that the topology is configured with server/nodes 140 acting as web servers, app servers, an integration layer, and a database. A load balancer 107 is configured between each server/node 140.

Power consumption information that is received is recorded from each server/node 140, stored in the server inventory database 125, and used to route traffic for optimal sustainability at every transaction hop.

Figure 3:
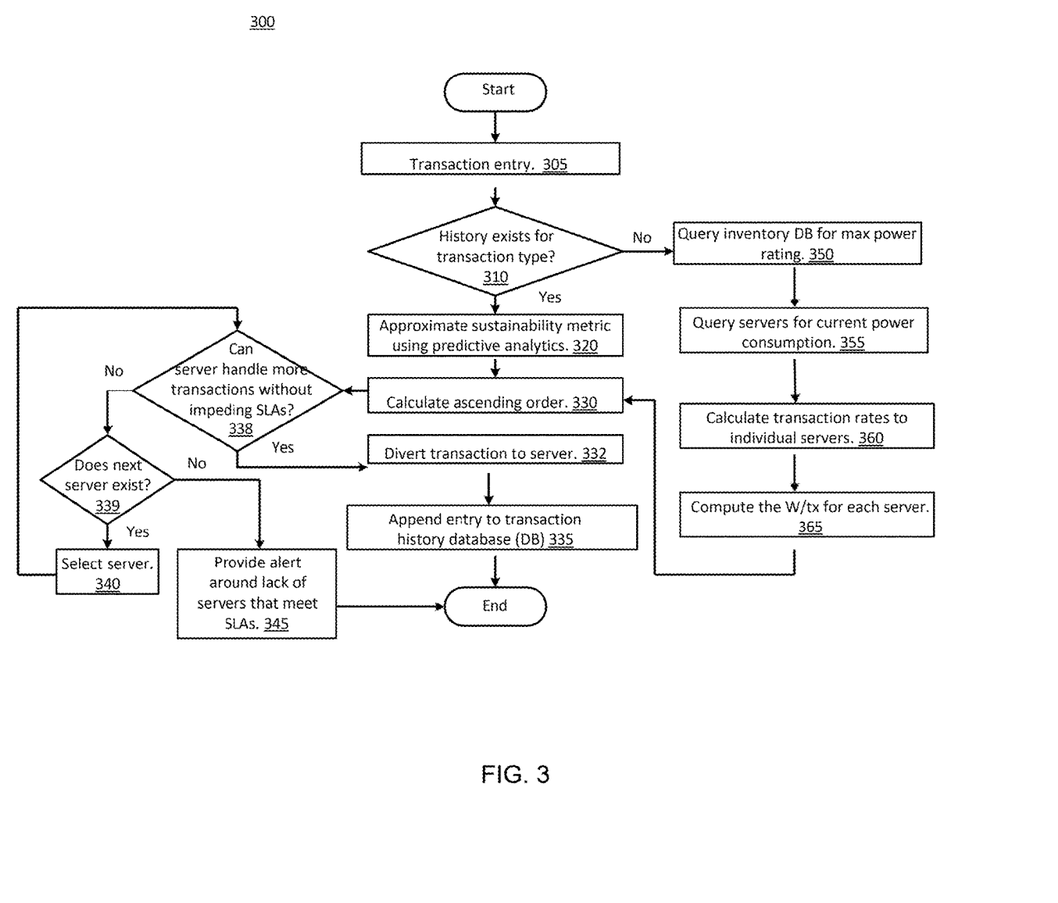
FIG. 3 is a flow chart illustrating the operation of a load balancer, according to embodiments of the present invention.

FIG. 3 illustrates the operation of a load balancer 107, according to embodiments of the present invention.

The load balancer 107 receives a transaction that it will route to one or more server/nodes 140 (305). At 310, the load balancer 107 checks the transaction history database 120 for an entry corresponding to the received transaction type. The transaction is not broken into its components. Many different types of transactions may be routed to a server/node 140 within the path. Different transactions may use different protocols, call different programs, require heavier computing resources, reference different databases or different amounts of data from a database, and may require a response to be sent back to the initiating device. Metadata from the transaction can be used to categorize/cluster types of transactions which can be used for comparison to historical records and/or as input to predictive model 110.

If the transaction is not found ("No" at 310), there is no predictive analysis of how much power the current transaction will draw since a similar transaction type is not recorded in the transaction history database 120, and therefore has not been previously seen. In this case, the server that is selected will be the one that has the fastest response time (i.e., lowest latency) and will not exceed its throughput limit. The servers/nodes 140 are ordered based on latency metrics at 330 if the "No" branch is taken. This may not be the most sustainable routing. However, it is necessary to start to gather power per transaction (i.e., W/tx) data for this new transaction type for future use by the predictive model 110 while still ensuring that the transaction type, currently unknown, meets SLAs. If the transaction is not found, the load balancer 107 queries the inventory database 125 for the maximum power consumption of each server/node 140 in the topology (350). The load balancer 107 then queries each server/node 140 in the topology for its current power consumption (355). The transaction rates to individual servers are calculated. This may be done by using various tools such as Dynatrace, Instana®, Splunk® etc. that provide consolidated transaction rates for workloads though instrumentation (360) (Instana® is a registered trademark of IBM in the United States. Splunk® is a registered trademark of Splunk Inc.). Next, the load balancer 107 computes the watts per transaction (W/tx) for each server (365), as discussed previously. The W/tx is calculated by taking the output of the overall workload power draw (at 360) and dividing it by the number of transactions. Data may also exist in the server inventory database 125. The W/tx rates are organized into an ascending order list (330) and the server/node 140 that most closely conforms to the SLA for that transaction is selected.

The load balancer 107 queries the selected server/node 140 for its performance metrics to determine if the additional transaction can be routed there without impeding the SLA (338). If so, then the load balancer 107 routes the transaction to the selected server/node 140 (332). An entry is appended to the transaction history database (335). The entry includes the transaction type, the selected server/node 140, the power (Watts) that the transaction consumes. Other metrics of the server/node 140 at the time of the current transaction's execution that could impact on the W/tx, such as workload percentage, CPU utilization, fan speeds and component health (i.e., whether any components were experiencing errors, faults, or failures) may be captured in the entry. The power consumption metric for the current transaction should be measured and included in the database entry. Alternatively, a data point could be added to the linear regression model or clustering model, such that a historical record of the transaction does not need to be saved, but the model continues to learn and improve.

It should be noted that the same transaction may consume different amounts of power on the same piece of hardware when that hardware is operating under different conditions, because power consumption can be dependent on many other factors on each server/node 140. For at least this reason, accurate measures of power sustainability for a transaction are only addressed by implementing a predictive model, such as is disclosed in embodiments of the present invention. This is because the variability in the data makes keeping a simple database of W/tx for a given transaction type on all servers in the topology impractical.

If the selected server/node 140 cannot accept the additional transaction, the load balancer 107 determines if there are more servers/nodes 140 in the list (339). If so, then at 340 the load balancer 107 queries that next server/node 140 for its performance metrics. Processing returns to 338. However, if no other server/nodes 140 exist (339), the load balancer 107 generates an alert that no servers that meet the SLA are available for the transaction (345). In preferred embodiments, in addition to the notifications, the transaction may be executed by the most optimally determined server/node 140 from the list to get as close as possible to meeting the SLAs.

Returning now to 310, if the transaction is found, the load balancer 107 approximates the sustainability metric using predictive analytics and the predictive model 110 (320). The sustainability metric can be W/tx, MTOC, tx/W, and Carbon/tx, among other measurements. Processing then continues at 330.

In preferred embodiments, these metrics may be calculated specific to all available servers/nodes 140 within the current topology. That is, the W/tx are calculated for both a first server and a second server. The W/tx value may be different for the first and second servers due the current operating status of those servers. Having this metric for all current servers/nodes in the topology is what drives the ordering in step 330 when the "Yes" branch is taken at 310. This will allow the systems to be ordered from most sustainable to the least sustainable such that the most sustainable server/node 140 that meets SLAs can be selected as the flow progresses after 330.

FIG. 4 further illustrates applying AI and predictive modelling of 320 of FIG. 3, according to embodiments of the present invention.

At 405, the load balancer 107 gathers historic data on power consumption, as described previously, for similar transactions on each of the servers/nodes 140 in the topology. Here, similar transactions are those that share similar characteristics, such as execute on the same time of day, utilize the same software, utilize the same amount of memory, storage, CPU utilization, etc., come from a similar physical location, or have the same W/tx.

Figure 4A:
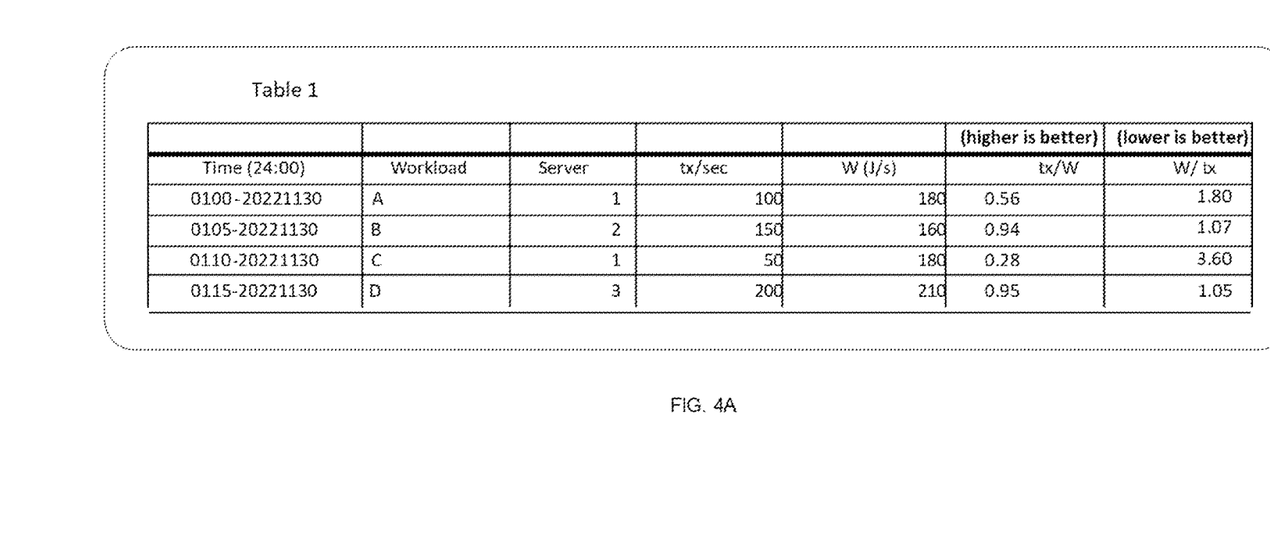
FIG. 4A illustrates exemplary sample data stored in the transaction database 120 and the power inventory database 125.

Sample data is shown in Table 1 of FIG. 4A. In Table 1, Tx/sec represents transaction per second, W (j/s) represents Watts (joules per second). Transactions per watt is shown as tx/W, and W/tx represents watts per transaction.

At 410, the load balancer 107 generates a regression model (e.g., light gradient boosting machine (LGBM) or linear regression) which is trained on the historic power consumption metrics. The linear regression model is a statistical model that estimates the relationship between one dependent variable that is the object of the prediction (e.g., W/tx) and one or more independent variables (e.g., the server and its current conditions) using a line or a plane in the case of two or more independent variables.

In alternate embodiments, instead of using a linear regression model, an eigenvector could be created that contains elements of each server/node condition (workload, total power, utilization, hardware availability, etc.) and transaction information such as the transaction type, originating location, etc. An eigenvalue can be assigned once the power is measured after the transaction completes. Clustering can then be used to classify new transactions into clusters for a new transaction running on each server/node and extracting/averaging the power of all prior transactions in the cluster.

At 415, the load balancer 107 predicts the current transaction request's power consumption based on the generated predictive model 110.

Figure 5:
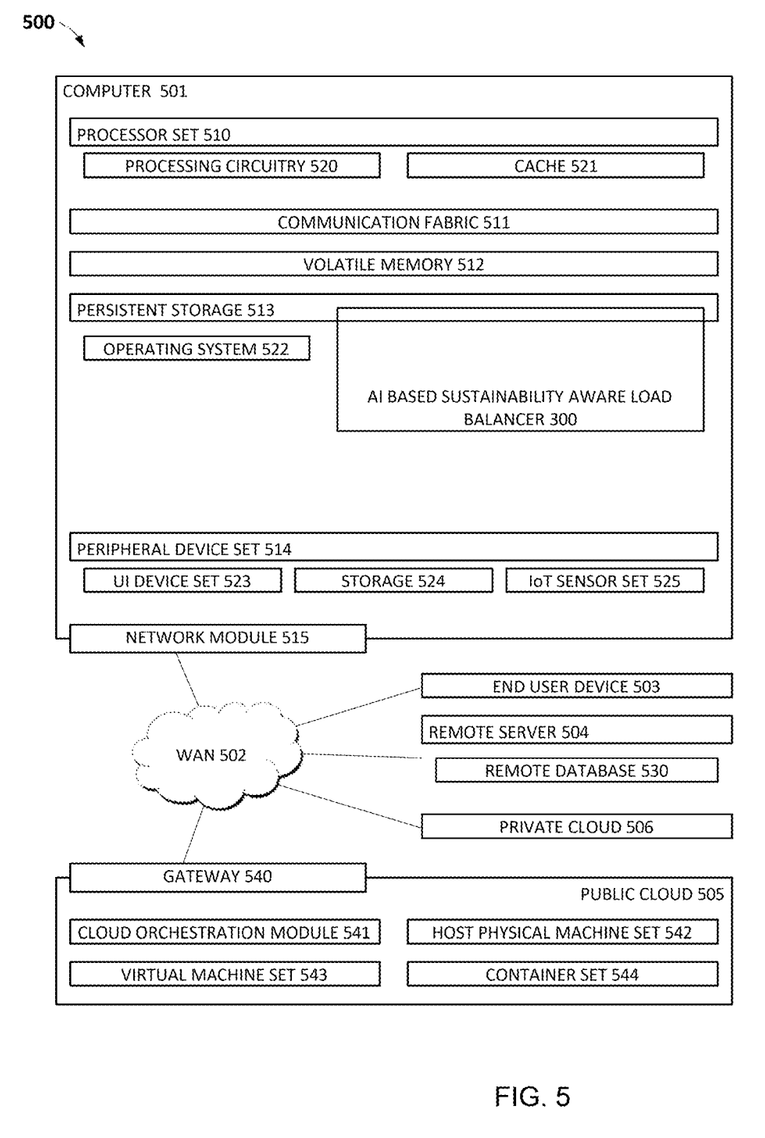
FIG. 5 illustrates the operating environment of a computer server embodying a system for AI based sustainability aware load balancing.

FIG. 5 illustrates an operating environment of a computer server embodying a system for an AI based sustainability aware load balancer.

Computing environment 500 contains an example of an environment for the execution of at least some of the computer code involved in performing the inventive methods, such as the AI based sustainability aware load balancer 300. In addition to block 300, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 300, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 300 in persistent storage 513.

COMMUNICATION FABRIC 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface type operating systems that employ a kernel. The code included in block 500 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, an administrator that operates computer 501), and may take any of the forms discussed above in connection with computer 501. For example, EUD 503 can be the external application by which an end user connects to the control node through WAN 502. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

What is claimed is:

1. A method of load balancing by a sustainability aware load balancer, the method comprising:
building a topology analyzer comprising available computer servers in a current network topology, a current workload of the available computer servers, a proximity of each available computer server to other available computer servers in the current network topology, and speed and power metrics;
building a machine learning regression model from a ledger of historical triaging of transactions per workload type, service level agreement definitions, and a server inventory comprising workload, environmental, and hardware specific power consumption metrics per available computer servers in the current network topology;
based on a type of a transaction being located in a transaction history database, selecting the available computer server by approximating a sustainability metric using the machine learning regression model,
based on the type of the transaction not being located in the transaction history database, selecting the available computer server from the server inventory an available computer server having a fastest response time, a least amount of power per transaction, and conforming to the service level agreements;
and
routing the transaction to the selected available computer server.

2. The method of claim 1, wherein more than one sustainability aware load balancer is installed between available computer servers in a transaction path.

3. The method of claim 1, wherein a sustainability aware load balancer receives the transaction at a transaction start.

4. The method of claim 1, wherein the sustainability aware load balancer selects the available computer server based on analyzing the power consumption metrics of each server in a transaction flow path.

5. The method of claim 1, wherein the machine learning regression model predicts the power consumption of the transaction based on a history of similar transactions under similar workloads to the power consumption of current workloads of the available computer servers in the current network topology.

6. The method of claim 1, wherein the load balancer prioritizes meeting the service level agreements over a minimum power consumption in selecting the available computer server.

7. The method of claim 1, wherein the power and workload is extracted from servers using information from orchestration tooling.

8. A computer program product for load balancing by a sustainability aware load balancer, comprising a non-transitory tangible storage device having program code embodied therewith, the program code executable by a processor of a computer to perform a method, the method comprising:
building a topology analyzer comprising available computer servers in a current network topology, a current workload of the available computer servers, a proximity of each available computer server to other available computer servers in the current network topology, and speed and power metrics;
building a machine learning regression model from a ledger of historical triaging of transactions per workload type, service level agreement definitions, and a server inventory comprising workload, environmental, and hardware specific power consumption metrics per available computer servers in the current network topology;
based on a type of a transaction being located in a transaction history database, selecting the available computer server by approximating a sustainability metric using the machine learning regression model,
based on the type of the transaction not being located in the transaction history database, selecting the available computer server from the server inventory an available computer server having a fastest response time, a least amount of power per transaction, and conforming to the service level agreements;
and
routing the transaction to the selected available computer server.

9. The computer program product of claim 8, wherein more than one sustainability aware load balancer is installed between servers in a transaction path.

10. The computer program product of claim 8, wherein a sustainability aware load balancer receives the transaction at a transaction start.

11. The computer program product of claim 8, wherein the sustainability aware load balancer selects the available computer server based on analyzing the power consumption metrics of each server in a transaction flow path.

12. The computer program product of claim 8, wherein the machine learning regression model predicts the power consumption of the transaction based on a history of similar transactions under similar workloads to the power consumption of current workloads of the available computer servers in a current network topology.

13. The computer program product of claim 8, wherein the load balancer prioritizes meeting the service level agreements over a minimum power consumption in selecting the available computer server.

14. The computer program product of claim 8, wherein the power and workload is extracted from servers using information from orchestration tooling.

15. A computer system for load balancing by a sustainability aware load balancer, comprising:
one or more processors;

a memory coupled to at least one of the processors;

a set of computer program instructions stored in the memory and executed by at least one of the processors in order to perform actions of:

building a topology analyzer comprising available computer servers in a current network topology, a current workload of the available computer servers, a proximity of each available computer server to other available computer servers in the current network topology, and speed and power metrics;

building a machine learning regression model from a ledger of historical triaging of transactions per workload type, service level agreement definitions, and a server inventory comprising workload, environmental, and hardware specific power consumption metrics per available computer servers in the current network topology;

based on a type of a transaction being located in a transaction history database, selecting the available computer server by approximating a sustainability metric using the machine learning regression model, based on the type of the transaction not being located in the transaction history database, selecting the available computer server from the server inventory an available computer server having a fastest response time, a least amount of power per transaction, and conforming to the service level agreements;

routing the transaction to the selected available computer server.

16. The computer system of claim 15, wherein more than one sustainability aware load balancer is installed between servers in a transaction path.

17. The computer system of claim 15, wherein a sustainability aware load balancer receives the transaction at a transaction start.

18. The computer system of claim 15, wherein the sustainability aware load balancer selects the available computer server based on analyzing the power consumption metrics of each server in a transaction flow path.

19. The computer system of claim 15, wherein the machine learning regression model predicts the power consumption of the transaction based on a history of similar transactions under similar workloads to the power consumption of current workloads of the available computer servers in a current network topology.

20. The computer system of claim 15, wherein the load balancer prioritizes meeting the service level agreements over a minimum power consumption in selecting the available computer server.

* * * * *